US012725792B2

(12) United States Patent
Cheng et al.

(10) Patent No.: US 12,725,792 B2
(45) Date of Patent: Sep. 1, 2026

(54) DOPED SODIUM ANODE, BATTERY HAVING A DOPED SODIUM ANODE, AND METHODS OF USE THEREOF

(71) Applicant: Board of Trustees of Northern Illinois University, Dekalb, IL (US)

(72) Inventors: Yingwen Cheng, Sycamore, IL (US); Tao Xu, Naperville, IL (US)

(73) Assignee: Board of Trustees of Northern Illinois University, Dekalb, IL (US)

( * ) Notice: Subject to any disclaimer, the term of this patent is extended or adjusted under 35 U.S.C. 154(b) by 514 days.

(21) Appl. No.: 18/033,780

(22) PCT Filed: Nov. 2, 2021

(86) PCT No.: PCT/US2021/057765
§ 371 (c)(1),
(2) Date: Apr. 25, 2023

(87) PCT Pub. No.: WO2022/098666
PCT Pub. Date: May 12, 2022

(65) Prior Publication Data

US 2023/0335724 A1 Oct. 19, 2023

Related U.S. Application Data

(60) Provisional application No. 63/109,243, filed on Nov. 3, 2020.

(51) Int. Cl.
*H01M 4/38* (2006.01)
*H01M 4/134* (2010.01)
(Continued)

(52) U.S. Cl.
CPC .......... *H01M 4/381* (2013.01); *H01M 4/134* (2013.01); *H01M 4/387* (2013.01); (Continued)

(58) Field of Classification Search
CPC ...... H01M 4/381; H01M 4/134; H01M 4/387; H01M 10/0568; H01M 10/0569; H01M 2004/027
See application file for complete search history.

(56) References Cited

U.S. PATENT DOCUMENTS 4,330,601 A 5/1982 Dey
9,099,718 B2 8/2015 Lu et al.
(Continued)

FOREIGN PATENT DOCUMENTS

CN 1415123 4/2003
CN 110265654 9/2019
(Continued)

OTHER PUBLICATIONS

U.S. Appl. No. 16/386,162, filed May 18, 2021, US.
(Continued)

*Primary Examiner* — Jane J Rhee
(74) *Attorney, Agent, or Firm* — EVAN LAW GROUP LLC

(57) ABSTRACT

An anode of a battery comprises sodium metal, and a dopant, in the sodium metal. The anode has a thickness of at most 80 μm, and the dopant is a metal with an electronegativity greater than sodium. A battery includes an anode, an anode charge collecting element in contact with the anode, a cathode, a cathode charge collecting element in contact with the cathode, an electrolyte in contact with the anode and the cathode, and a housing, enclosing the anode, anode charge colleting element, cathode, cathode charge collecting element and electrolyte. The anode in the battery comprises sodium metal doped with a dopant, and the dopant is present in an amount of 0.01 to 1.0 atomic percent.

20 Claims, 11 Drawing Sheets

(51) Int. Cl.
*H01M 4/02* (2006.01)
*H01M 10/0568* (2010.01)
*H01M 10/0569* (2010.01)

(52) U.S. Cl.
CPC .. *H01M 2004/027* (2013.01); *H01M 10/0568* (2013.01); *H01M 10/0569* (2013.01)

(56) References Cited

U.S. PATENT DOCUMENTS

| | | | | |
|---|---|---|---|---|
| 10,263,254 | B2 | 4/2019 | Kendrick et al. | |
| 11,217,788 | B2 | 1/2022 | Cheng et al. | |
| 11,677,072 | B2 | 6/2023 | Cheng et al. | |
| 2008/0318128 | A1 | 12/2008 | Simoneau et al. | |
| 2015/0056515 | A1* | 2/2015 | Kim | H01M 4/483 204/157.43 |
| 2015/0093644 | A1* | 4/2015 | Han | H01M 10/054 252/519.15 |
| 2019/0088986 | A1* | 3/2019 | Hu | H01M 10/054 |
| 2022/0158180 | A1 | 5/2022 | Cheng | |
| 2023/0335724 | A1 | 10/2023 | Cheng et al. | |

FOREIGN PATENT DOCUMENTS

| | | | | |
|---|---|---|---|---|
| CN | 202080040727.6 | | 5/2021 | |
| CN | 202210941198.8 | | 3/2025 | |
| EP | 0 347 952 | | 12/1989 | |
| EP | 0347952 | A2 * | 12/1989 | H01M 4/13 |
| EP | 20722974.1 | | 10/2022 | |
| HK | 62022057619.8 | | 10/2024 | |
| JP | H0726343 | | 1/1995 | |
| JP | 2015-022903 | | 2/2015 | |
| WO | 2014/194709 | | 12/2014 | |
| WO | 2020/214691 | | 10/2020 | |
| WO | 2022/098666 | | 5/2022 | |

OTHER PUBLICATIONS

U.S. Appl. No. 16/386,162, filed Jul. 23, 2021, US.
U.S. Appl. No. 16/386,162, filed Aug. 19, 2021, US.
U.S. Appl. No. 16/386,162, filed Nov. 1, 2021, US.
U.S. Appl. No. 17/533,550, filed Dec. 1, 2022, US.
U.S. Appl. No. 17/533,550, filed Jan. 17, 2023, US.
U.S. Appl. No. 18/033,780, filed Nov. 14, 2025, US.
Whittingham, M.S., "Ultimate limits to intercalation reactions for lithium batteries", Chemical Reviews, vol. 1.14, pp. 11414-11443, (2014).
Yang, Z. et al., "Electrochemical energy storage for green grid", Chemical Reviews, vol. 111, pp. 3577-3613, (2011).
Scrosati, B. et al., "Lithium-ion batteries. A look into the future", Energy & Environmental Science, vol. 4, pp. 3287-3295, (2011).
Lu, K et al., "Manipulating polysulfide conversion with strongly coupled $Fe_3O_4$ and nitrogen doped carbon for stable and high capacity lithium-sulfur batteries", Advanced Functional Materials, vol. 29, pp. 1807309-1-1807309-8, (2019).
Albertus, P., "Status and challenges in enabling the lithium metal electrode for high-energy and low-cost rechargeable batteries", Nature Energy, vol. 3, pp. 16-21, (2018).
Lin, D. et al., "Reviving the lithium metal anode for high-energy batteries", Nature Nanotechnology, vol. 12, pp. 194-206, (2017).
Xu. W. et al., "Lithium metal anodes for rechargeable batteries", Energy & Environmental Science, vol. 7, pp. 513-537, (2014).
Cheng, X-B. et al., "Toward safe lithium metal anode in rechargeable batteries. A review", Chemical Reviews, vol. 117, pp. 10403-10473, (2017).
Qian, J. et al., "High rate and stable cycling of lithium metal anode", Nature Communications, vol. 6, pp. 1-9, found at www.nature.com/articles/ncomms7362#supplementary-information, (2015).
Zheng, J. et al., "Electrolyte additive enabled fast charging and stable cycling lithium metal batteries", Nature Energy, vol. 2, pp. 1-8, found at www.nature.com/articles/nenergy201712#supplementary-information, (2017).
Tikekar, M.D. et al., "Design principles for electrolytes and interfaces for stable lithium-metal batteries", Nature Energy, vol. 1, pp. 1-7, article No. 16114, (2016).
Aurbach, D et al., "A short review of failure mechanisms of lithium metal and lithiated graphite anodes in liquid electrolyte solutions", Solid State Ionics, vol. 148, pp. 405-416, (2002).
Bieker, G. et al., "Electrochemical in situ investigations of SEI and dendrite formation on the lithium metal anode", Physical Chemistry Chemical Physics, vol. 17, pp. 8670-8679, (2015).
Lu, D. et al. "Failure mechanism for fast-charged lithium metal batteries with liquid electrolytes", Advanced Energy Materials, vol. 5, pp. 1-7, (2015).
Aurbach, D. et al., "Factors which limit the cycle life of rechargeable lithium (metal) batteries". vol. 147, No. 4, pp. 1274-1279, (2000).
Li, G. et al., "Stable metal battery anodes enabled by polyethylenimine sponge hosts by way of electrokinetic effects", Nature Energy, vol. 3, pp. 1076-1083, (2018).
Wei, S. et al., "Electrochemical interphases for high-energy storage using reactive metal anodes", Accounts of Chemical Research, vol. 51, pp. 80-88, (2018).
Xin, S. et al., "Solid-state lithium metal batteries promoted by nanotechnology: Progress and prospects", ACS Energy Letters, vol. 2, pp. 1385-1394, (2017).
Li, N.W. et al., "An artificial solid electrolyte interphase layer for stable lithium metal anodes"; Advanced Materials, vol. 28, pp. 1853-1858, (2016).
Liang, J. et al., "In situ LisPS4 solid-state electrolyte protection layers for superior long-life and high-rate lithium-metal anodes", Advanced Materials, vol. 30, pp. 1804684-1-1804684-9, (2018).
Kim, M.S. et al., "Langmuir-Blodgett artificial solid-electrolyte interphases for practical lithium metal batteries". Nature Energy, vol. 3. pp. 889-898, (2018).
Jiao, S. et al., "Stable cycling of high-voltage lithium metal batteries in ether electrolytes", Nature Energy, pp. 739-746, (2018).
Slotboom, J.W. et al., "Measurements of bandgap narrowing in Si bipolar transistors", Solid-State Electronics, vol. 19, pp. 857-862, (1976).
Jensen, T. et al., "Investigation of diode-pumped 2.8-μm Er:$LIYF_4$ lasers with various doping levels", Optics Letters, vol. 21, No. 8, pp. 585-587, (1996).
Bang, H.J. et al., "Electrochemical investigations of lithium-aluminum alloy anode in Li/polymer cells", Journal of Power Sources, vol. 92, pp. 45-49. (2001).
Stark, J.K. et al., "Dendrite-free electrodeposition and reoxidation of lithium-sodium alloy for metal-anode battery", Journal of the Electrochemical Society, vol. 158, No. 10, pp. A1100- A1105, (2011).
Xu. T. et al., "Synthesis of supported platinum nanoparticles from Li—Pt solid solution", Journal of the American Chemical Society, vol. 132, pp. 2151-2153, (2010).
Barkholtz, H.M et al., "Lithium assisted "Dissolution-Alloying" synthesis of nanoalloys from individual bulk metals". Chemistry of Materials, vol. 28, pp. 2267-2277, (2016),.
Pelton, A.D. "The Ag—Li (Silver-Lithium) system", Bulletin of Alloy Phase Diagrams, vol. 7, No. 3, pp. 223-228, (1986).
Kozen, A.C. et al., "Next-generation lithium metal anode engineering via atomic layer deposition"; ACS Nano, vol. 9, No. 6, pp. 5884-5892, (2015).
Li, G. et al., "Self-formed hybrid interphase layer on lithium metal for high-performance lithium-sulfur batteries", ACS Nano, vol. 12, pp. 1500-1507, (2018).
Bensalah, N. et al., "Review on synthesis, characterizations, and electrochemical properties of cathode materials for lithium ion batteries", Journal of Material Science & Engineering, vol. 5, issue 4, pp. 1000258-1-1000258-21, (2016).
Arora, P. et al., "Battery separators", Chemical Reviews, vol. 104, No. 10, pp. 4419-4462, (2004).
Schroder, R. et al., "Comparatively assessing different shapes of lithium-ion battery cells", ScienceDirect Procedia Manufacturing, vol. 8, pp. 104-111, (2017).

(56) References Cited

OTHER PUBLICATIONS

Cao, C. et al., "Recent advances in inorganic solid electrolytes for lithium batteries", Frontiers in Energy Research, vol. 2, article 25, pp. 1-9. (2014).
Barkholtz. J.M. "Synthesis and characterization of nanoalloys and non-precious metal catalysts for energy and environmental applications", Northern Illinois University, Huskie Commons Institutional Repository, pp. 1-248, (2016).
Lu, K. et al., "Modulating reactivity and stability of metallic lithium via atomic doping", Journal of Materials Chemistry A, vol. 8, pp. 10363-10369, (2020).
International Search Report and Written Opinion dated Jun. 17, 2020 for PCT application No. PCT/US2020/028297.
Guidotti, R.A. et al., "Thermally activated ("thermal") battery technology Part IV. Anode materials", Journal of Power Sources, vol. 183, pp. 388-398, (2008).
Sangster. J. et al., "The Li—Sn (lithium-tin) system", Journal of Phase Equilibria, vol. 19, No. 1, pp. 70-75, (1998).
Alexander, W.A. et al., "The lithium-indium system", Canadian Journal of Chemistry, vol. 54, pp. 1052-1060, (1976).
Okamoto, H. Cu—Li (Copper-Lithium), Journal of Phase Equilibria and Diffusion, vol. 32, No. 2, p. 172, (2011).
Okamoto, H. "Li—Zn (Lithium-Zinc)", Journal of Phase Equilibria and Diffusion, vol. 33, No. 4, p. 345, (2012).
American Society for Metals, "Li—Ni Phase Diagram", Binary Alloy Phase Diagrams, vol. 2, p. 1494, (1986).
International Search Report and Written Opinion dated Feb. 28, 2022 for PCT application No. PCT/US2020/057765.
Luo, C. et al., "Mechanically robust gel polymer electrolyte for an ultrastable sodium metal battery", Small, vol. 16, No. 2, 1906208, pp. 1-7, (2020).
Chi, S-S. et al., "3D flexible carbon felt host for highly stable sodium metal anodes", Advanced Energy Materials, vol. 8, No. 15, 1702764, pp. 1-10, (2018).
Lu, K. et al., "Regulating interfacial Na-Ion flux via artificial layers with fast ionic conductivity for stable and high-rate Na metal batteries", ACS Materials Letters, vol. 1, pp. 303-309, (2019).
Lee, B. et al., "Sodium metal anodes: Emerging solutions to dendrite growth", Chemical Reviews, vol. 119, No. 8, pp. 5416-5460, (2019).
Cao, R. et al., "Enabling room temperature sodium metal batteries", Nano Energy, vol. 30, pp. 825-830, (2016).
Wang, S. et al., "Stable sodium metal batteries via manipulation of electrolyte solvation structure", Small Methods, vol. 4, No. 5, pp. 1-8, 1900856, (2020).
Gu, H. et al., "Highly reversible alloying/dealloying behavior of SnSb nanoparticles incorporated into N-rich porous carbon nanowires for ultra-stable Na storage", Energy Storage Materials, vol. 21, pp. 203-209, (2019).
Shi, Q. et al., "High-performance sodium metal anodes enabled by a bifunctional potassium salt", Angewandte Chemie International Edition, vol. 57, No. 29, pp. 9069-9072, (2018).
Lee, Y. et al., "Fluoroethylene carbonate-based electrolyte with 1 M sodium bis(fluorosulfonyl)imide enables high-performance sodium metal electrodes", ACS Applied Materials & Interfaces, vol. 10, No. 17, pp. 15270-15280, (2018).
Zheng, J. et al., "Extremely stable sodium metal batteries enabled by localized high-concentration electrolytes", ACS Energy Letters, vol. 3, No. 2, pp. 315-321, (2018).
Wang, S. et al., "Stable cycling of Na metal anodes in a carbonate electrolyte", Chemical Communications, vol. 55, No. 95, pp. 14375-14378, (2019).
Yu, Q. et al., "Liquid electrolyte immobilized in compact polymer matrix for stable sodium metal anodes", Energy Storage Materials, vol. 23, pp. 610-616, (2019).
Luo, J. et al., "Pillared MXene with ultralarge interlayer spacing as a stable matrix for high performance sodium metal anodes", Advanced Functional Materials, vol. 29, No. 3, pp. 1-12, 1805946, (2019).
Xu, Z. et al., "Stable Na metal anode enabled by a reinforced multistructural SEI layer", Advanced Functional Materials, vol. 29, No. 27, pp. 1-10, 1901924, (2019).
Zhu, M. et al., "Dendrite-free sodium metal anodes enabled by a sodium benzenedithiolate-rich protection layer", Angewandte Chemie International Edition, vol. 59, No. 16, pp. 6596-6600, (2020).
Luo, W. et al., "Ultrathin surface coating enables the stable sodium metal anode", Advanced Energy Materials, vol. 7, No. 2, pp. 1-6, 1601526, (2017).
Niu, C. et al., "Self-smoothing anode for achieving high-energy lithium metal batteries under realistic conditions", Nature Nanotechnology, vol. 14, No. 6, pp. 594-601, (2019).
Wang, Z. et al., "Lightweight, thin, and flexible silver nanopaper electrodes for high-capacity dendrite-free sodium metal anodes", Advanced Functional Materials, vol. 28, No. 48, pp. 1-9, 1804038, (2018).
Ye, L. et al., "A sodiophilic interphase-mediated, dendrite-free anode with ultrahigh specific capacity for sodium-metal batteries", Angewandte Chemie International Edition, vol. 58, No. 47, pp. 17054-17060, (2019).
Wang, Y. et al., "Development of solid-state electrolytes for sodium-ion battery-A short review", Nano Materials Science, vol. 1, pp. 91-100, (2019).
Brant, W.R et al., "Selective control of composition in prussian white for enhanced material properties", Chemistry of Materials, vol. 31. no. 18, pp. 7203-7211 (2019).
Yabuuchi, N. et al. "P2-type $NA_x[Fe_{frax;1;2}Mn_{frax;1;2]O2}$ made from earth-abundant elements for rechargeable Na batteries", Nature Materials, vol. 11, No. 6, pp. 512-517 (2012).
Keller, M. et al., "Layered Na-Ion Cathodes with Outstanding Performance Resulting from the Synergetic Effect of Mixed P- and O-Type Phases", Advanced Energy Materials. vol. 6, No. 3. pp. 1-11. 1501555, (2016).
NEI Corporation, "Sodium-ion battery materials", NEI Corporation, pp. 1-5, found at www.neicorporation.com/products/batteries/sodium-ion-battery-materials/, printed on Feb. 4, 2026.

* cited by examiner 0.2 AT. % Sn DOPED Na

UNDOPED Na 0.2 AT. % Sn

UNDOPED Na

DOPED SODIUM ANODE, BATTERY HAVING A DOPED SODIUM ANODE, AND METHODS OF USE THEREOF

BACKGROUND

The rapid growth of large scale energy storage systems in transportation and smart grids applications demands for batteries that are cheaper and more robust compared with the state-of the art sodium-ion batteries (LIB).[1] Metallic anodes such as Li, Na and Mg have several times higher specific capacities compared with typical intercalation anodes (such as graphite) and are widely considered as ideal materials for the next generation batteries.[2] Among them, Na metal is earth abundant and has the combined advantages of a low electrochemical potential (−2.714 V vs. the standard hydrogen electrode) and a high theoretical capacity of 1166 mAh $g^{-1}$, and is one of the most promising anode candidates.[3] The coupling of Na metal anodes with conversion type cathodes, for example, will provide low-cost batteries with energy densities several times higher than LIB, such as the 1274 Wh $kg^{-1}$ for Na—S batteries and the 1605 Wh $kg^{-1}$ for Na—$O_2$ batteries.[4,5] The practical deployment of Na metal batteries requires dendrite free Na anodes with ideally 100% plating-stripping coulombic efficiency.[6] Unfortunately, Na metal has aggressive chemical reactivity, and this presents several major challenges that are severely roadblocking its commercialization. Na metal is naturally unstable in almost all liquid and solid electrolytes and spontaneously form unstable solid-electrolyte interphases (SEI), which induces substantial turbulences on interfacial Na-ion transport during Na plating and accelerate growth of unsafe dendrites.[7] Such spontaneous reactions irreversibly consume both fresh Na and battery electrolyte, leading to accumulation of loose but thick inactive mossy Na and premature battery failure with rapid capacity decay.[8] Substantial developments on rational materials and interfaces are needed in order to realize truly reversible Na metal anodes.[9]

Many strategies have been proposed in recent years to protect Na metal under various conditions. Some notable strategies include the use of novel electrolytes that promotes in-situ formation of stronger SEI layers such as by incorporating fluorinated electrolyte additives,[10] concentrated salts[11] and alternative solvents.[7, 12] The application of artificial SEI layers on Na metal surface has also been demonstrated to reduce dendrite growth and improve cycling efficiency.[13-17] In addition to surface protection, three-dimensional (3D) functional hosts play essential roles to stabilize Na metal during repeated stripping and plating cycling due to its "hostless" nature and infinite volume change.[5] As widely demonstrated in Li metal anodes, these hosts not only structurally mitigate the huge volume changes of Na metal but also reduce the effective surface current density, and hence improve both high rate performance and cycling stability as demonstrated recently with flexible carbon felts, porous carbon and Ag nanowire meshes.[3,18,19]

SUMMARY

In a first aspect, the present invention is an anode comprising sodium metal and a dopant. The anode has a thickness of at most 80 μm and the dopant is a metal with an electronegativity greater than sodium. Preferably the dopant comprises tin.

In a second aspect, the present invention is a battery, comprising an anode, an anode charge collecting element, a cathode, a cathode charge collecting element, an electrolyte, and a housing. The anode comprises sodium doped with a dopant.

In a third aspect, the present invention is a method of making a doped sodium anode comprising: melting sodium metal, introducing a dopant metal into the sodium metal to form molten doped sodium metal, solidifying the doped sodium metal, and forming the doped sodium metal into a foil having a thickness of at most 450 μm.

In a fourth aspect, the present invention is a method of generating electricity from the above battery, comprising: connecting the anode and cathode of the battery to an external load to complete a circuit.

In a fifth aspect, the present invention is a method of recharging the above battery, comprising: connecting the battery to an electrical power source.

Definitions

A "cell" is basic electrochemical unit that contains the electrodes, separator, and electrolyte.

A "battery" is defined as a collection of cells or cell assemblies, with housing, electrical connections, and optionally additional elements for protection or control.

A "dopant" refers to any metal additive that does not form intermetallic compounds with the primary metal in the amount used.

"Anode" refers to the electrode where oxidation takes place during the discharge cycle. The anode may be one continuous body, or it may include more than one thin film attached to a current collecting element.

"Cathode" refers to the electrode where reduction takes place during the discharge cycle. The cathode may be one continuous body, or it may include more than one thin film attached to a current collecting element.

"Separator" refers to a barrier between the cathode and the anode to prevent them from coming into contact. If the electrolyte is solid, a separator is not necessary to avoid contact between the anode and cathode.

"Electrolyte" refers to a solution containing a solvent and ions, which conducts ions but is an insulator to electrons. An electrolyte may be a liquid, solid, or gel.

"Cycle" refers to the process of charging a rechargeable battery and discharging it as required into a load. The term is typically used to specify a battery's expected life, as the number of charge cycles affects life more than the mere passage of time.

All percentages refer to atomic percentage, unless otherwise specified. Where the dopant percentage is not specified, the atomic percent of dopant is 0.1 percent.

DETAILED DESCRIPTION

Despite the great progress in protecting sodium metal, there has been little effort on modulating the inherent physicochemical properties of metallic Na, which fundamentally limits the performance improvements. It is therefore of great interest and practical significance to explore approaches specifically designed to manipulate the fundamental behavior of Na metal. The addition of dopants as trace impurities is a powerful approach for altering the electrical or optical properties of a substrate, and has been widely demonstrated in fields such as solid-state electronics and lasers. The present invention describes anodes of sodium metal doped with trace amounts of a dopant, such as antimony, indium, lead, bismuth, thallium, or tin. The doped metal exhibits enhanced chemical stability and much better electrochemical reactivity. The dopant atoms are atomically dispersed in the Na crystal (FIG. 1). The dopants have higher electronegativity than sodium atoms and strongly attract electrons in their vicinity, which increases the work function and reduces the reactivity of Na metal, leading to doped electrodes that are more stable in dry air. The dopant atoms have stronger binding with Na atoms and guide uniform Na plating, which fundamentally mitigate growth of unsafe dendrites. The combination of these benefits promoted generation of much thinner but stronger SEI layers during cycling in carbonate electrolytes, and enabled high-capacity and durable battery cycling both in symmetric cells and in full cells.

Figure 1A:
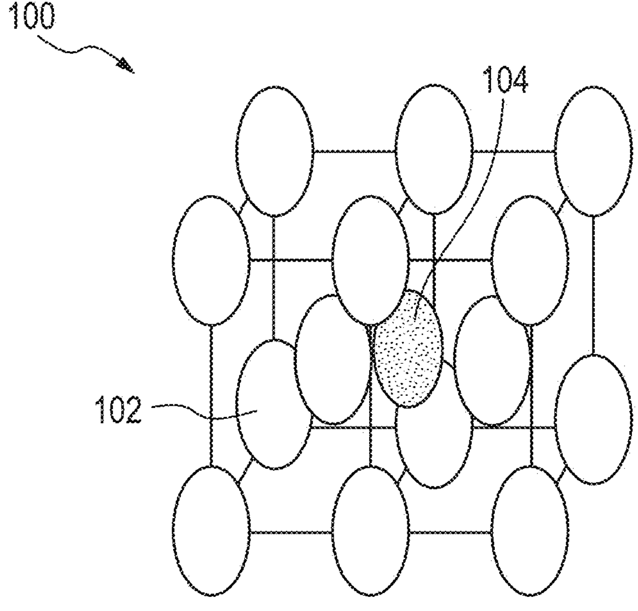
FIG. 1A schematic illustration of the dopant structure.
Figure 1B:
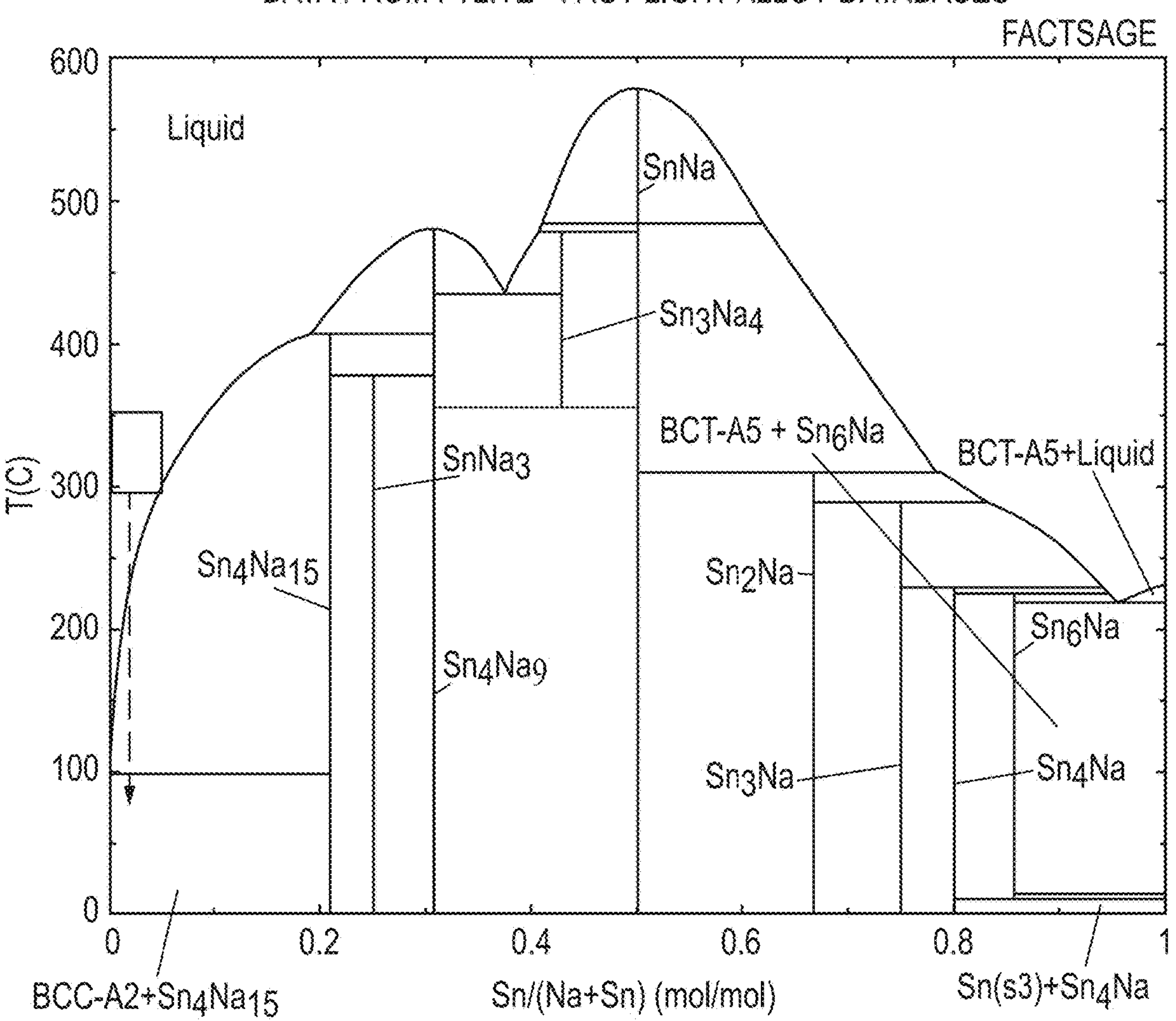
FIG. 1B is a phase diagram of Sn—Na.

FIG. 1A illustrates the crystal structure of a doped sodium anode, 100 comprising sodium metal, 102 and a dopant, 104. FIG. 1B illustrates a Sn—Na phase diagram, the Sn doped Na electrodes can be synthesized by adding less than 1.0 atomic percent of Sn to molten Na, followed by rapid quenching, typically by pouring the molten mixture on a large stainless-steel plate at room temperature.

The dopant may be any metal that has an electronegativity greater than the electronegativity of sodium. The dopant may be beryllium, magnesium, aluminum, calcium, scandium, titanium, vanadium, chromium, manganese, iron, nickel, cobalt, copper, zinc, gallium, germanium, yttrium, zirconium, niobium, molybdenum, ruthenium, rhodium, palladium, silver, cadmium, indium, tin, antimony, lanthanum, cerium, praseodymium, neodymium, samarium, europium, gadolinium, terbium, dysprosium, holmium, erbium, thulium, ytterbium, lutetium, hafnium, tantalum, tungsten, rhenium, osmium, iridium, platinum, gold, mercury, lead, bismuth, actinium, protactinium, thorium, neptunium, uranium, americium, plutonium, and curium. Preferably the dopant is antimony, indium, lead, bismuth, thallium, or tin, most preferably tin.

The anode of the present invention includes sodium metal doped with a dopant. The dopant may be present in an amount of 0.01-2.0 atomic percent, including 0.02, 0.03, 0.04, 0.05, 0.06, 0.07, 0.08, 0.09, 0.1, 0.3, 0.4, 0.5, 0.6, 0.7, 0.8, 0.9, 1.0, 1.1, 1.2, 1.3, 1.4, 1.5, 1.6, 1.7, 1.8, and 1.9. Preferably the dopant is present in an amount of 0.05-0.5 atomic percent. Preferably, the dopant does not form intermetallic phases, and is present interstitially or replaces a sodium atom in the sodium crystal structure.

The doped sodium may be pressed into foils with a thickness of 1 to 450 μm. Preferably the foil has a thickness of less than 80 μm, including 5, 10, 15, 20, 25, 30, 35, 40, 45, 50, 55, 60, 65, 70, and 75 μm. Most preferably, the foil has a thickness of at most 30 μm.

Preferably the doped anode is stable in dry air. The surface corrosion of doped and undoped electrodes in dry air may be measured by measuring the Rat (charge transfer resistance) of doped and undoped sodium anodes. The doped anode preferably passes the resistance stability test which requires the doped anode to have a resistance, measured after 7 days of exposure in dry air, that is 1/10 or less than the resistance of an undoped sodium anode, when the resistance of the anodes is measured using electrochemical impedance spectroscopy (EIS) analysis of symmetric coin cells assembled with the doped and undoped sodium anodes with 1.0M $NaPF_6$ in ethylene carbonate/propylene carbonate (EC/PC) as the electrolyte (1:1 volume).

Optionally, the anode may be incorporated into a battery, having a cathode, electrolytes and a housing. The battery may also include charge collecting elements on the anode and cathode to gather or distribute the electrons. The charge collecting elements may be connected to an external circuit that is optionally connected to a load or to a recharging source.

Figure 2:
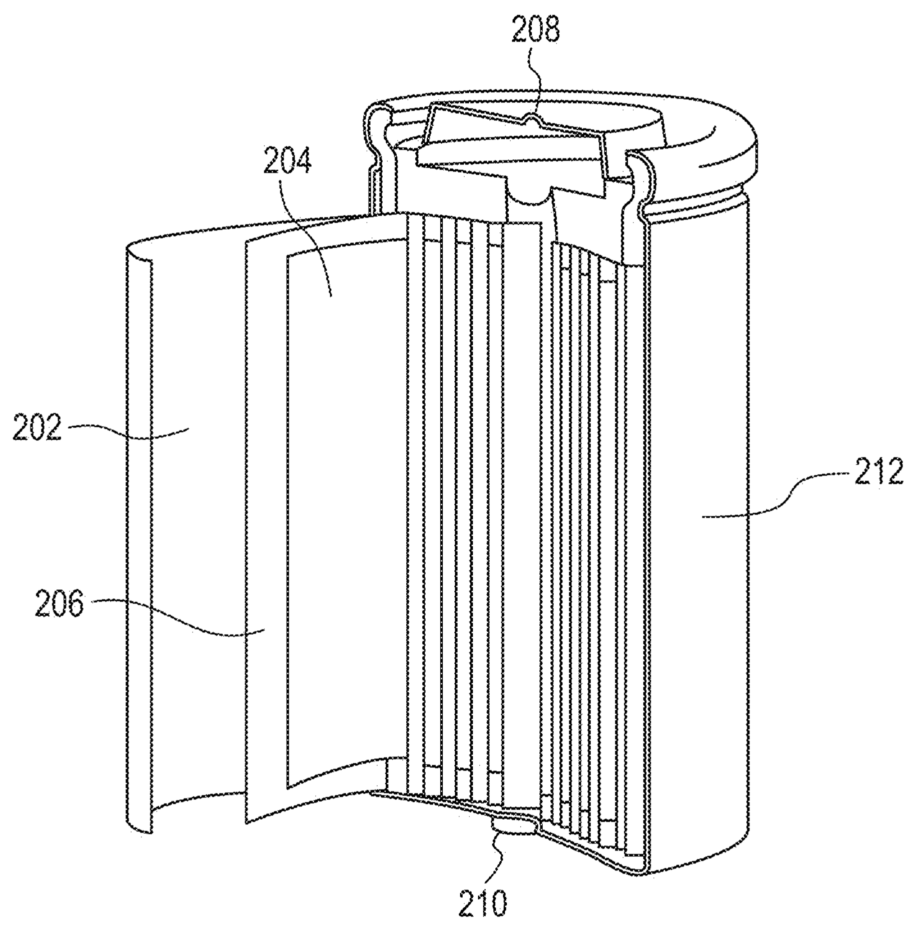
FIG. 2 shows a battery having a cathode, anode, and separator.
Figure 3:
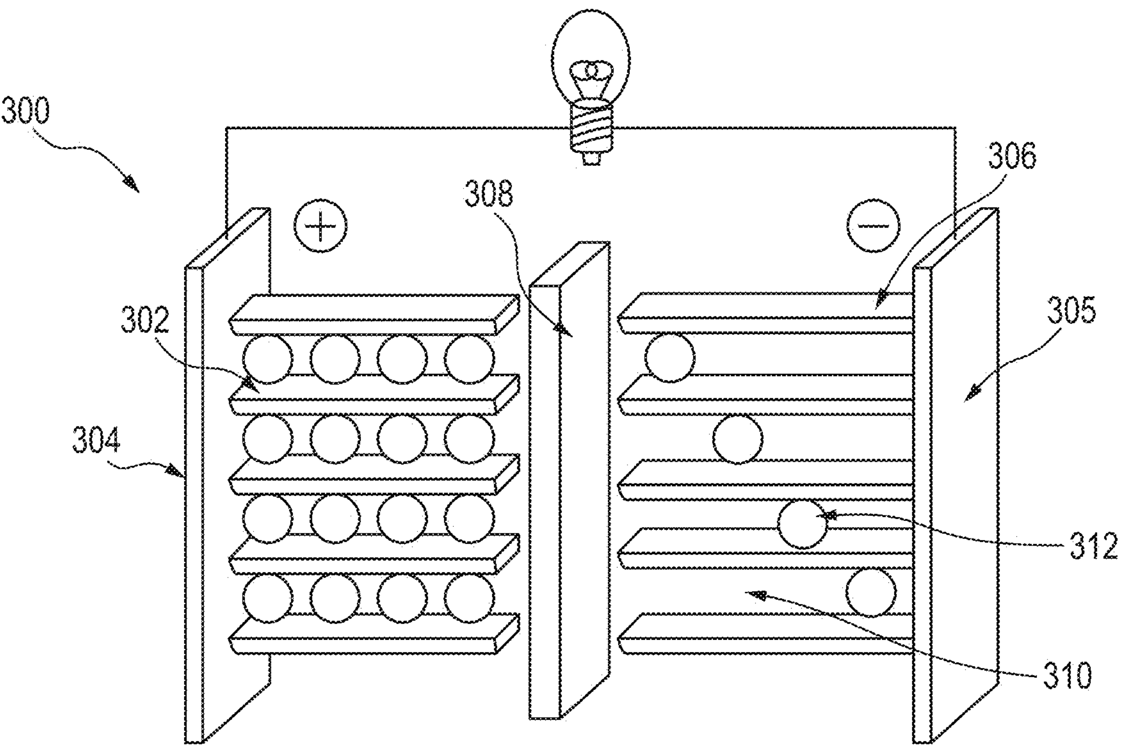
FIG. 3 illustrates a schematic of a sodium ion battery.
Figure 4:
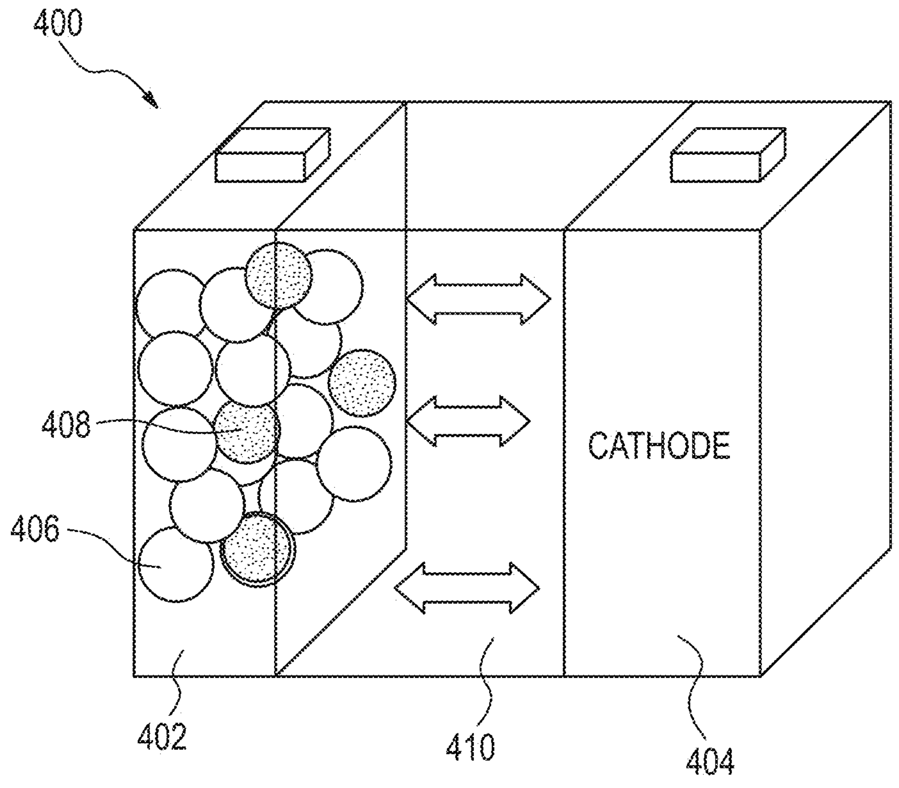
FIG. 4 schematic illustration of sodium batteries incorporating doped sodium electrodes.

FIG. 2 illustrates a battery, 200. The battery has an anode, 202 and a cathode, 204. The anode and cathode are rolled up, and a separator, 206, is between the cathode and anode. The battery has a positive terminal, 208 and a negative terminal 210. The battery is enclosed in a housing, 212. FIG. 3 illustrates a schematic of a battery, 300. The battery has a cathode, 302, illustrated as thin film strips, attached to a cathode charge collecting element, 304. The anode, 306 is attached to an anode charge collecting element, 305. A separator, 308 is positioned between the anode and cathode. The electrolyte, 310 is in contact with the anode and cathode, and allow for the movement of ions, 312 between the anode and cathode. FIG. 4 illustrates a schematic of a battery cell, 400. The battery has an anode, 402, a cathode, 404, and an electrolyte, 410. The anode includes sodium, 406 and a dopant, 408.

In a sodium-ion battery, the sodium ions move from the anode to the cathode during discharge and in the opposite direction during recharge. The electrolyte carries positively charged sodium ions from the anode to the cathode and vice versa through the separator. The movement of the sodium ions creates free electrons in the anode which creates a charge at the anode current collecting element. The electrical current then flows from the current collector on the cathode, through a load (device being powered), to the current collecting element on the anode. When the battery is being recharged the electrons and ions flow in the opposite directions.

Preferably the battery maintains a capacity of at least 50% of the battery's initial capacity after 200 to 1000 cycles. The battery may retain a capacity of 55%, 60%, 65%, 70%, 75%, 80%, 85%, 90%, 95% and 100% of the battery's initial capacity after 200 cycles. Most preferably the battery maintains a capacity of at least 70% of the initial capacity for 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780 or 800 cycles.

The cathode material may be an oxide, such as sodium cobalt oxide, sodium manganese oxide, sodium nickel manganese oxide ($NaNi_xMn_{1-x}O_2$ (x is between 0 and 1)), sodium nickel manganese cobalt oxide, sodium iron managanese oxide, sodium iron phosphate, sodium manganese phosphate, sodium vanadium phosphate, $Na_{2/3}Fe_{1/2}Mn_{1/2}O_2$ oxide, mixed P3/P2/O3-type $Na_{0.76}Mn_{0.5}Ni_{0.3}Fe_{0.1}Mg_{0.1}O_2$ oxide, or O3-type $NaNi_{1/4}Na_{1/6}Mn_{2/12}Ti_{4/12}Sn_{1/12}O_2$ oxide. The cathode may include $Mo_6S_8$, which is a very stable cathode material. Prussian Blue Analogues (PBAs) may also be desirable with sodium cathode. PBAs include rhombohedral $Na_xMn[Fe(CN)_6]$. $Na_xCo[Fe(CN)_6]$ and rhombohedral Prussian white $Na_xFe[Fe(CN)_6]\cdot 0.18(9)H_2O$ (x is in the range of 0 to 10) (U.S. Pat. No. 9,099,718 and Brant et al., "Selective Control of Composition in Prussian White for Enhanced Material Properties", Chemistry of Materials, Vo. 31, No. 18, pp. 7203-7211 (2019)). The cathodes of Komaba et al. "P2-type $Na_x[Fe_{1/2}Mn_{1/2}]O_2$ made from earth-abundant elements for rechargeable Na batteries" Nature Materials, Vol. 11, No. 6, pp. 512-517 (2012) may also be used.

Other cathode materials of interest are sulfur and oxygen. Sodium-sulfur and sodium-oxygen batteries have advantages over sodium-ion cells because of their higher energy density and reduced cost from the use of sulfur. Sulfur has low conductivity, so the sulfur cathodes may also be paired with a highly conductive material to improve the conductivity. A carbon coating may be used to provide the missing electroconductivity. Sulfur based electrodes include copolymerized sulfur, sulfur-graphene oxide, and sulfur/sodium-sulfide.

Separators are preferred components in liquid electrolyte batteries. In the case of a liquid electrolyte, the separator is a porous material that is soaked with the electrolyte and holds it in place. The separator needs to be an electronic insulator while having minimal electrolyte resistance, maximum mechanical stability, and chemical resistance to degradation in the highly electrochemically active environment. In addition, the separator often has a safety feature, called "thermal shutdown", which at elevated temperatures, melts or closes its pores to shut down the sodium-ion transport without losing its mechanical stability. Separators are either synthesized in sheets and assembled with the electrodes or deposited onto one electrode in situ. A separator generally includes a polymeric membrane forming a microporous layer. The separator may be made from nonwoven fibers, such as cotton, nylon, polyesters, glass; polymer films, such as polyethylene, polypropylene, poly (tetrafluoroethylene), polyvinyl chloride; ceramic; and naturally occurring substances, such as rubber, asbestos, or wood. The separator materials described in Arora, P. et al., Battery Separators *Chemical Reviews* 2004 104(10), pg. 4419-4462 may also be used.

The electrolyte provides a medium for the transport of the sodium ions from the cathode to the anode and vice versa. Types of electrolytes include liquid, polymer, and solid-state electrolytes. Liquid electrolytes in sodium-ion batteries include salts, such as NaFSI, NaTFSI, $NaPF_6$, $NaBF_4$, and $NaClO_4$, and a solvent, such as ethylene carbonate, propylene carbonate dimethyl carbonate, diethyl carbonate, dimethoxyethane, diglyme, triethylene glycol dimethyl ether, and tetraethylene glycol dimethyl ether or mixtures thereof. The selection of the electrolyte may be influenced by the selection of the cathode material. One skilled in the art would select an appropriate electrolyte, an appropriate electrolyte volume, and an appropriate electrolyte concentration based on the cathode material, separator material, anode material, and cell design. The concentration of the electrolyte may be 0.1 M to 10.0 M, including 0.2, 0.3, 0.4, 0.5, 0.6, 0.7, 0.8, 0.9, 1.0, 2.0, 3.0, 4.0, 5.0, 6.0, 7.0, 8.0, and 9.0 M. Preferably the concentration of the electrolyte is 0.5-2.0 M. Preferably the electrolyte is $NaPF_6$ in ethylene carbonate/dimethyl carbonate (EC/DMC) or $NaPF_6$ in ethylene carbonate/propylene carbonate (EC/PC). The ratio of the ethylene carbonate to propylene carbonate is preferably 1:1 by volume.

The electrolyte may be a solid or semi solid such as a ceramic. Solid electrolytes avoid the risk of leaks, and a separator is not necessary as the solid electrolyte prevents contact between the anode and the cathode. Solid ceramic electrolytes are mostly sodium metal oxides or sulfides. Common ceramic electrolytes are sodium super ion conductors (NASICON), ($\beta$-$Al_2O_3$ solid electrolyte (BASE), or sodium aluminum titanium phosphate ("NATP"). The solid electrolytes described in Wang, et al., "Development of solid-state electrolytes for sodium-ion battery—A short review", Vol. 1, pp. 91-100 (2019) may also be used.

The current collecting element collects the electrons from the anode during discharge, prior to the electrons entering the external circuit. The current collecting element on the cathode will distribute the electrons to the cathode material. During recharging the electrons move in the opposite direction. The current collecting elements may comprise aluminum, copper, steel, or other conductive materials. The charge collecting elements include flexible carbon felts, porous carbon and silver nanowire meshes, which may provide a "host" for the sodium.

The housing encloses the battery and prevents the electrolyte for leaking. The housing may comprise metal or plastics. The housing may be rigid or flexible. Flexible housing materials allows for expansion of the cell during recharging, or for expansion caused by gas formation inside the battery. The battery structures and manufacturing techniques described in Schroder et al., "Comparatively assessing different shapes of lithium-ion battery cells", *ScienceDirect Procedia Manufacturing*, Vol. 8, pg. 104-111 (2017) may also be used.

The battery shape and design may be selected from various shapes to optimize the battery and avoid overheating, increase energy density, or reduce self-discharge. Common battery designs include small cylindrical (solid body without terminals, such as those used in older laptop batteries), button cells, prismatic cells, large cylindrical (solid body with large threaded terminals), pouch (soft, flat body, such as those used in cell phones and newer laptops; also referred to as Na-ion polymer or sodium polymer batteries), and rigid plastic case with large threaded terminals (such as in electric vehicles).

EXAMPLES

Example 1

Figure 5:
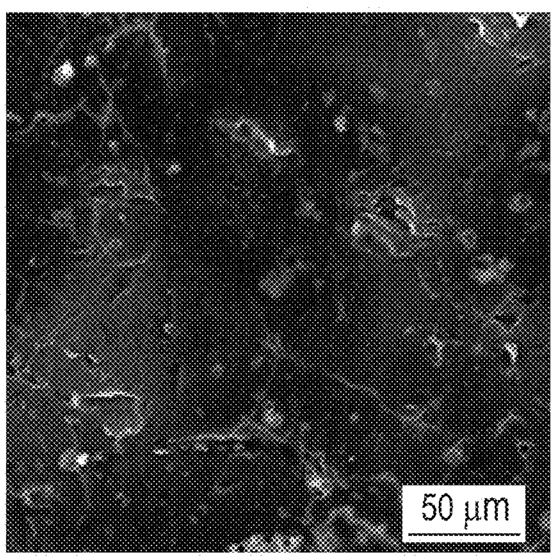
FIG. 5 Scanning electron microscope (SEM) image of 0.2 atomic % Sn doped Na anode.

Materials Synthesis:

This example focuses on Sn as the dopant, but the same principle can be used to produce Sb, In, Pb, Bi, Tl, etc. doped Na electrodes as long as the dopant metal is soluble in molten Na. The atomic concentration of Sn can be varied from 0.01% to 1% to ensure complete solvation without formation of crystalline compounds, as determined from the Sn—Na phase diagrams (FIG. 1B). The doping was performed inside an argon-filled glovebox where the oxygen and moisture levels were both <0.5 ppm. Typically, 2.0 g Na metal (99.9%, Sigma-Aldrich) was added to a 10 ml crucible, which was slowly heated to 200° C. using a heating mantle. An appropriate amount of Sn foil was then added and it generally dissolved in molten Na within few seconds. The molten mixture was maintained at 200° C. for 2 hours to ensure complete solvation of Sn. The molten mixture was quenched to room temperature and the doped Na was obtained (FIG. 5). The solidified Sn-doped Na lump was pressed into foils with the thickness of 400, 80 or 30 μm using a rolling press. These foils were cut into 16 mm discs for investigation of their physicochemical properties and electrochemical behavior. The undoped Na electrodes were prepared using the identical procedure without addition of dopants to ensure the results are comparable.

Electrochemical Measurements:

All battery studies were performed using type 2025 coin cells assembled in an Ar-filled glovebox (FIG. 4). Cyclic voltammograms were recorded using a CH Instruments potentiostat. Battery cycling behavior was evaluated using Neware model CT-4008 battery analyzers. Electrochemical impedance spectra were acquired at room temperature with the frequency range of 0.02 Hz to 100 kHz. The symmetric coin cells were assembled using Na metal anodes of identical composition and the electrolyte was 1.0 M $NaPF_6$ in ethylene carbonate/propylene carbonate (EC/PC, 1:1 vol). The electrolyte volumes were 70 μl unless otherwise noted. The full cells were assembled with the very stable $Mo_6S_8$ cathodes (FIG. 4). The $Mo_6S_8$ was coated on Al foils with an area capacity of ~1.5 mAh $cm^{-2}$, which was punched into discs and vacuum dried overnight at 75° C. prior to use.

Figure 6:
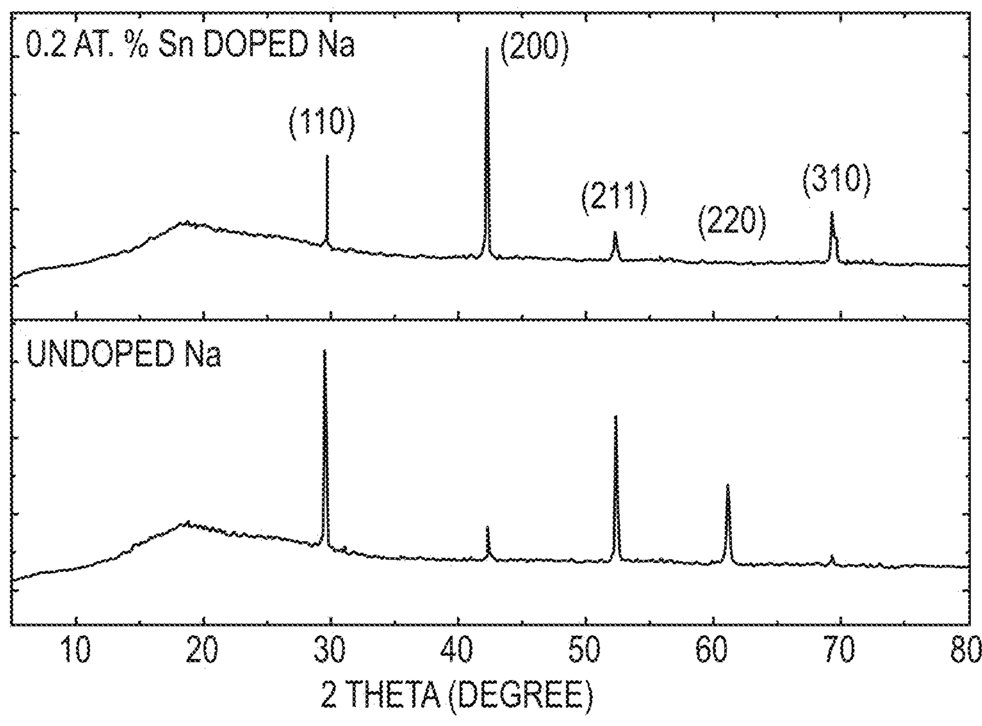
FIG. 6 is a graph of X-ray diffraction pattern of undoped Na and 0.2 atomic % Sn doped Na.
Figure 7A:
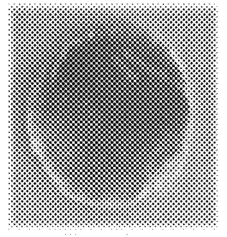
FIG. 7A is a photograph of a doped Na electrode after 7 days of exposure in dry air.
Figure 7A:
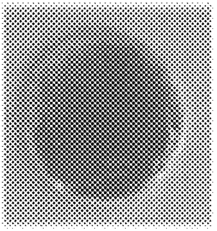
Figure 7B:
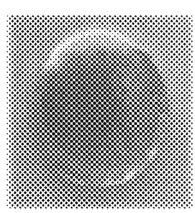
FIG. 7B is a photograph of an undoped Na electrode after 7 days of exposure in dry air.
Figure 7B:
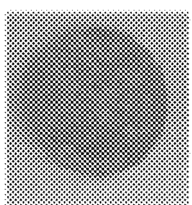
Figure 7C:
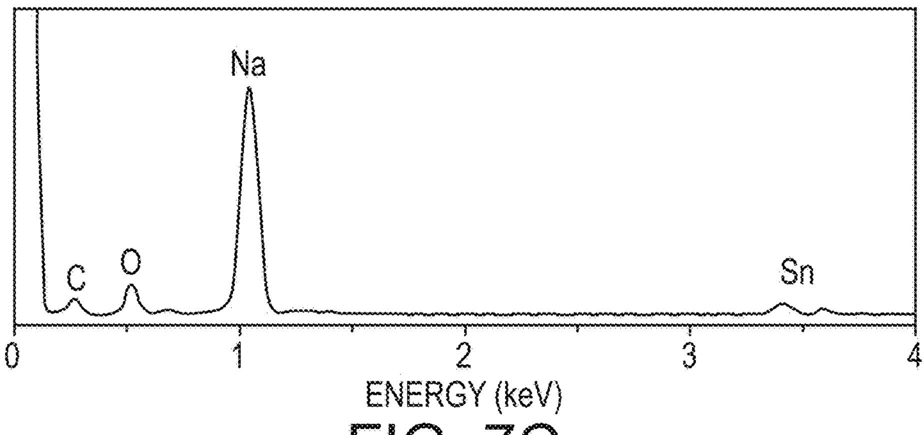
FIG. 7C is an energy-dispersive X-ray spectra (EDS) of a doped Na electrode after 7 days of exposure in dry air.
Figure 7D:
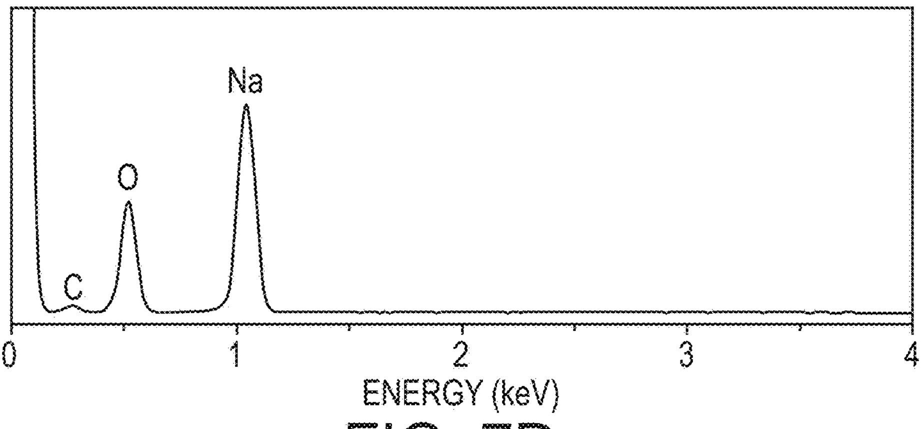
FIG. 7D is an energy-dispersive X-ray spectra (EDS) of an undoped Na electrode after 7 days of exposure in dry air.

Results:

FIG. 6 compares the X-ray diffraction patterns of undoped and 0.2 atomic % Sn doped Na metal electrode. Both electrodes exhibited diffraction peaks that can be indexed exclusively to the body-centered cubic (BCC) structure of metallic Na and no crystalline intermetallic Na—Sn compounds were identified. The enhanced (200) diffraction peak is an important feature for the doped Na electrode, this can be contributed by the selective occupancies of Sn dopant on the vacant face-centered sites in Na crystal structure as shown in FIG. 1A and/or preferred crystallographic orientation as a result of Sn doping.

Figure 8A:
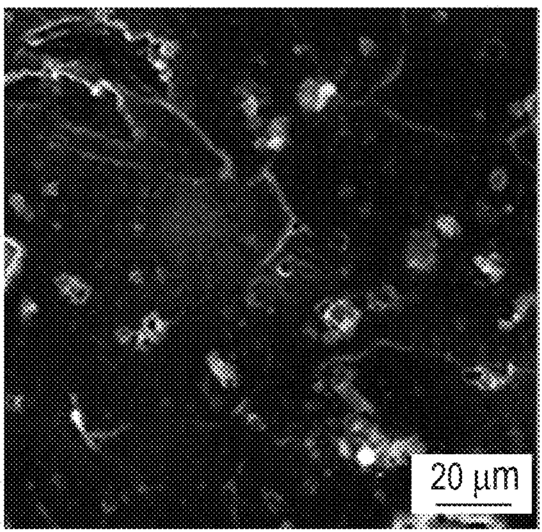
FIG. 8A is a scanning electron microscope image of doped Na after 2 days of exposure in dry air.
Figure 8B:
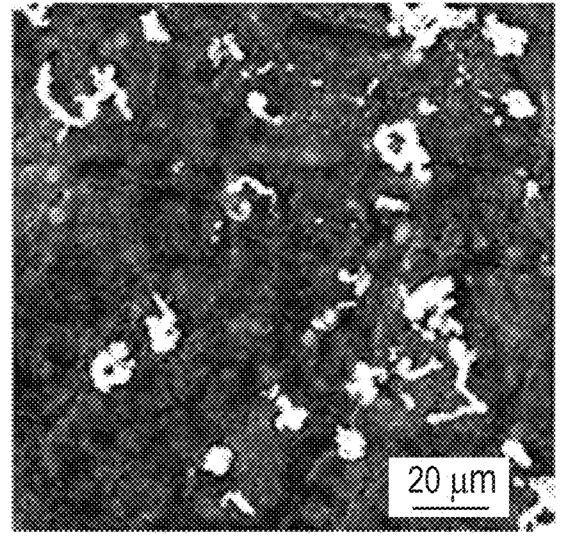
FIG. 8B is a scanning electron microscope image of undoped Na after 2 days of exposure in dry air.
Figure 9:
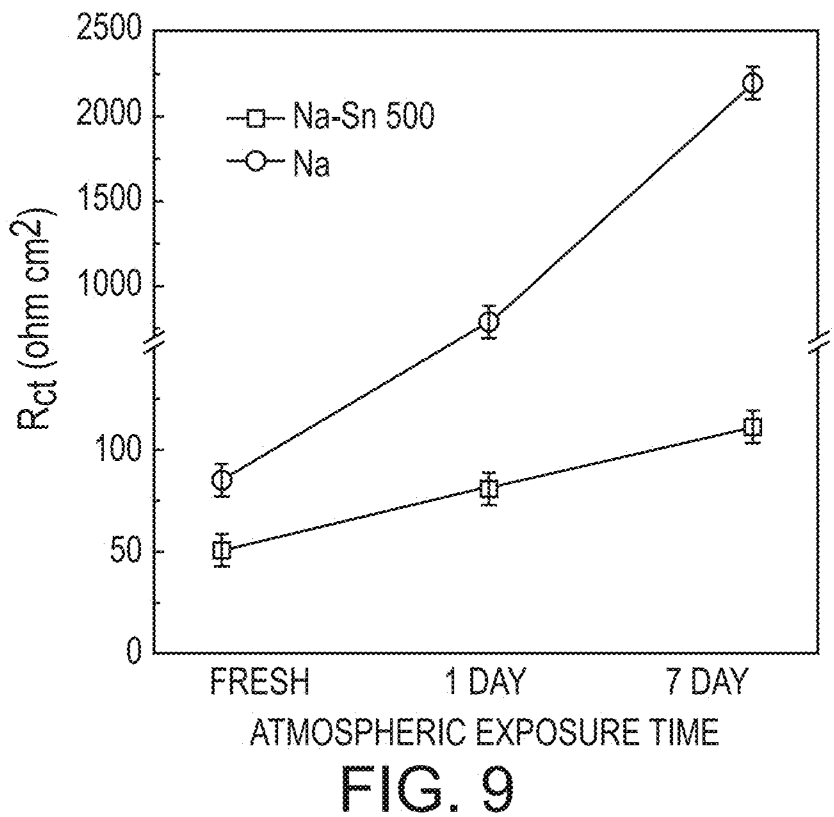
FIG. 9 is a graph comparing the charge-transfer resistance of doped and undoped Na after different days of exposure in dry air.

The surface stability of Na electrodes with and without Sn-doping in dry air where the relative humidity was <5% was compared. The undoped Na electrodes exhibited typical aggressive chemical reactivity and generated greyish tarnishing layers almost immediately (FIGS. 7A, 7B, 8A and 8B). The 0.2 atomic % Sn doped Na, on the other hand, exhibited significantly improved stability and remained shiny for several days. The surface of doped Na electrode remained flat and dense whereas undoped Na developed significant porosity with widespread corrosion pits (FIGS. 8A and 8B). In addition, the impacts of surface corrosion on the electrochemical activities ($Na^+/Na$ redox kinetics) was evaluated. This was done by EIS analysis of symmetric coin cells assembled with either undoped or doped Na electrodes after different days of exposure in dry air. The results are compared in FIG. 9 and reveal that the Ra (charge-transfer resistance) of Sn doped Na electrodes increased slightly after 7 days of exposure (51 to 110 $\Omega cm^{-2}$), which is dramatically better than the more than 20 increases in Ra for undoped Na electrodes within only two days. These results imply significantly improved dry-air stability of Na metal as a result of Sn doping, which can enable their direct integrations in the dry room based industrial manufacturing facilities without costly surface protection treatments.

Figure 10:
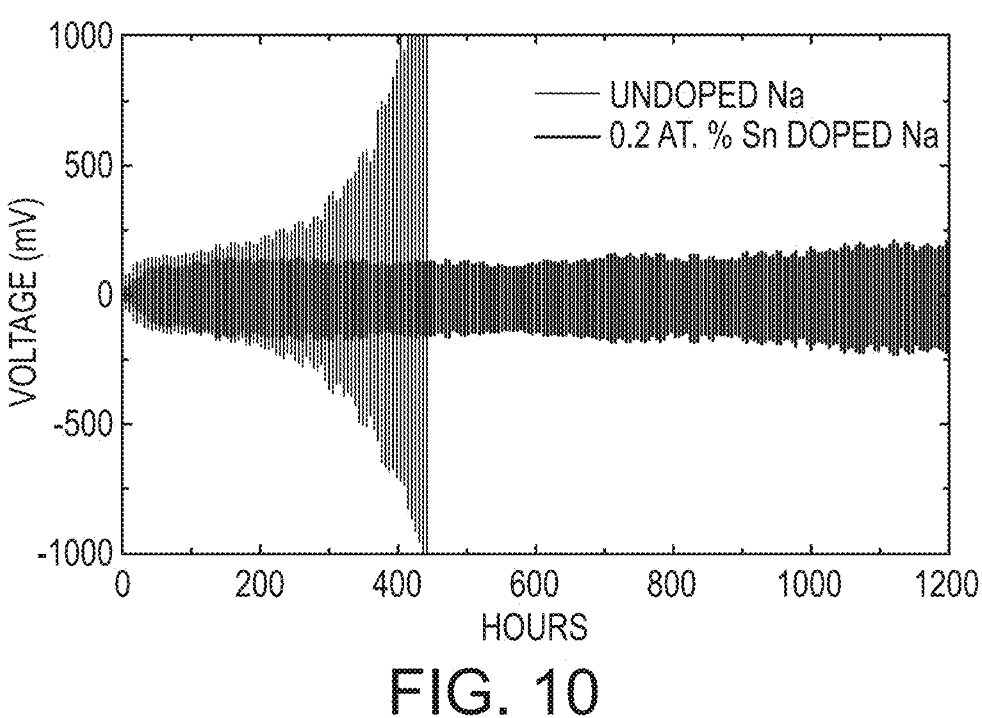
FIG. 10 is a graph of voltage profiles of symmetric coin cells assembled from undoped Na and 0.2 atomic % Sn doped Na, cycled at 0.5 mA $cm^{-2}$ and for 30 minutes each cycle.
Figure 11:
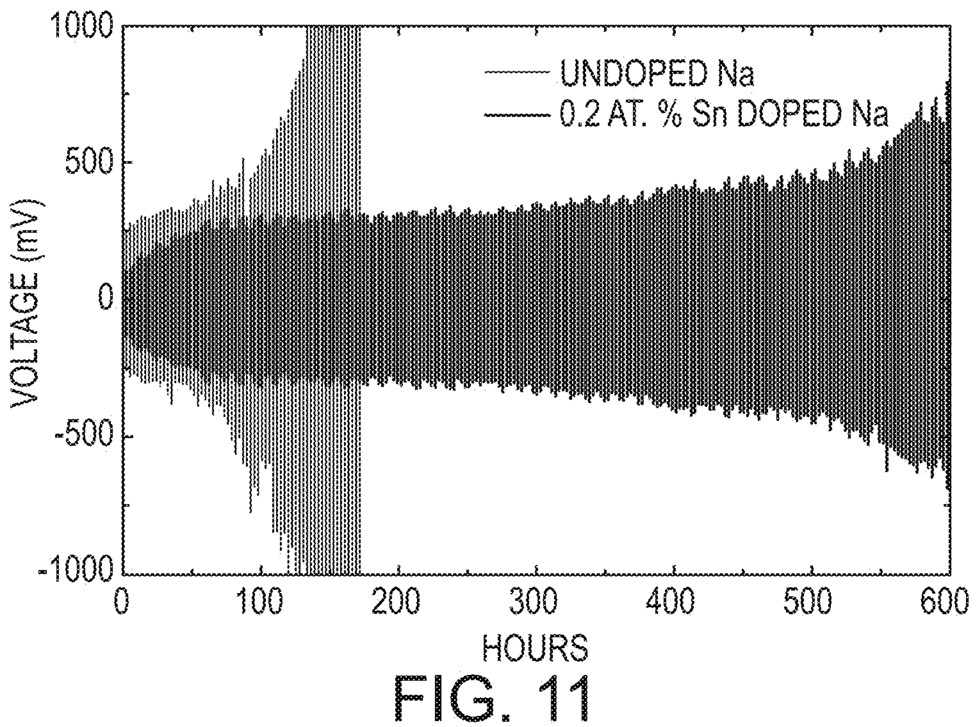
FIG. 11 is a graph of voltage profiles of symmetric coin cells assembled from undoped Na and 0.2 atomic % Sn doped Na, cycled at 0.5 mA $cm^{-2}$ and for 1 hour each cycle.
Figure 12:
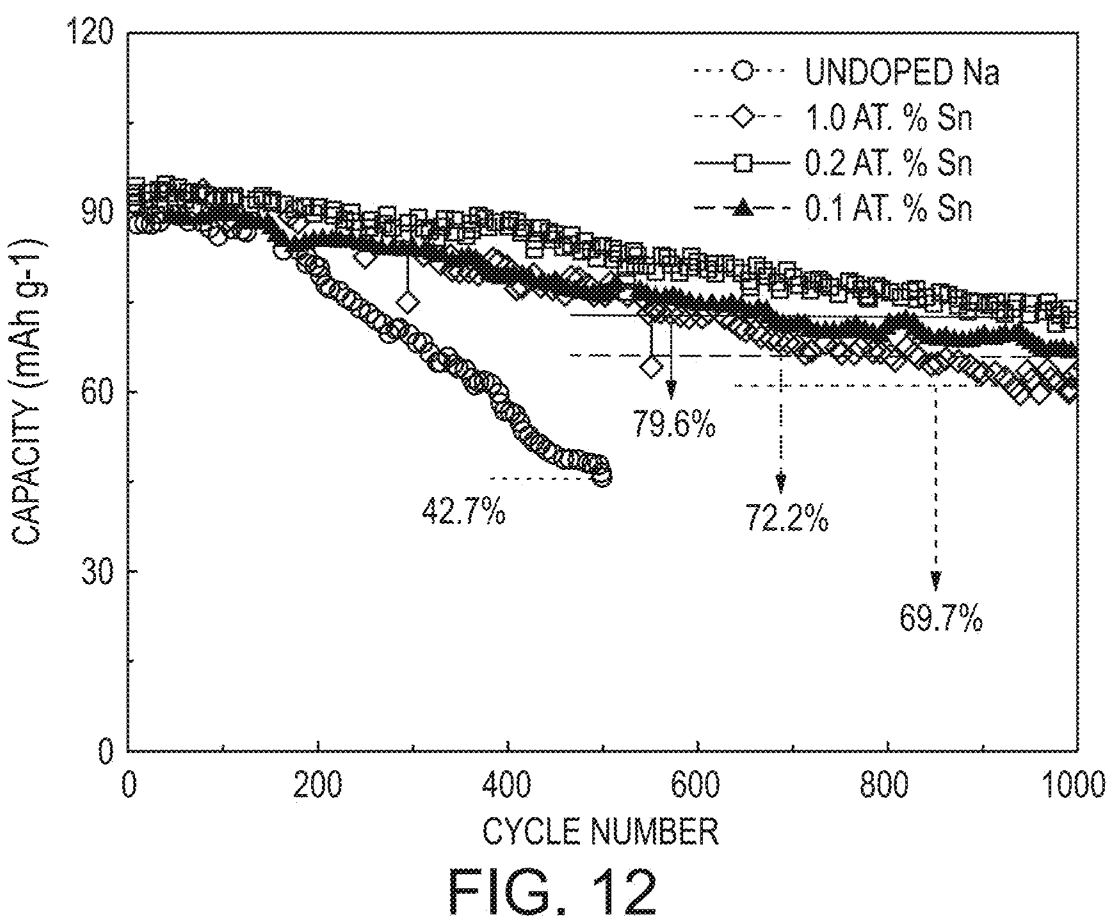
FIG. 12 is a graph showing the cycling stability of prototype Na batteries assembled with Na anodes with different concentrations of Sn doping.

The stability of doped Na electrodes in batteries was first evaluated using symmetric coin cell configuration, which was assembled using two Na electrodes with identical composition. These batteries were cycled at either 0.5 mA cm-2 or 4.0 mA $cm^{-2}$ at a capacity of 2.0 mAh $cm^{-2}$ for each cycle. The Sn doped Na electrodes exhibited outstanding stability under both testing conditions (FIG. 10-12). The overpotentials associated with Na plating and stripping remained relatively flat throughout testing, suggesting uniform Na plating without substantial perturbance in surface architectures. Although some random abnormal voltage spikes were indeed observed, such phenomenon was mostly associated with depletion of surface Na-ions under high currents and was generally disappeared shortly. The undoped Na anodes, on the other hand, exhibited substantial voltage fluctuations with large spikes, which are characteristic of uncontrollable growth of mossy inactive surface layers. In addition, the cell also exhibited failures of rapidly increased overpotential due to consumption of electrolytes after ~100 hours for the testing at 4.0 mA $cm^{-2}$ due to the unstable nature of undoped Na in carbonate electrolyte. In contrast, the doped Na electrode didn't exhibit such failure until 600 hours of cycling under the same condition, and therefore, the Sn-doped anode exhibited approximately six times improved durability.

In addition to symmetric cells, the improved stability of doped Na electrodes was also confirmed in Na metal full cells. These full cells were assembled with a prototype $Mo_6S_8$ cathode (with a real capacity of 1.5 mAh $cm^{-2}$). $Mo_6S_8$ was chosen for this demonstration because it is a very stable material and any observed degradation can be assigned to failures on the anode side (undoped Na vs. doped Na). Na electrodes with different concentrations of Sn dopant were prepared and examined, and the results are compared in FIG. 12. The capacity of batteries equipped with undoped Na anode decayed to less than 50% of the initial capacity after 500 cycles, which is typical for undoped Na due to failures at the Na metal side and the formation of inactive mossy Na over cycles. Notably, all batteries equipped with doped Na exhibited significantly improved stability compared with undoped Na. The overall capacity retention after 1000 cycles was ~70%. The best stability was observed for batteries equipped with the 0.2 atomic % Sn doped anode, where a remarkable retention of ~80% was observed after 1000 cycles.

Figure 13A:
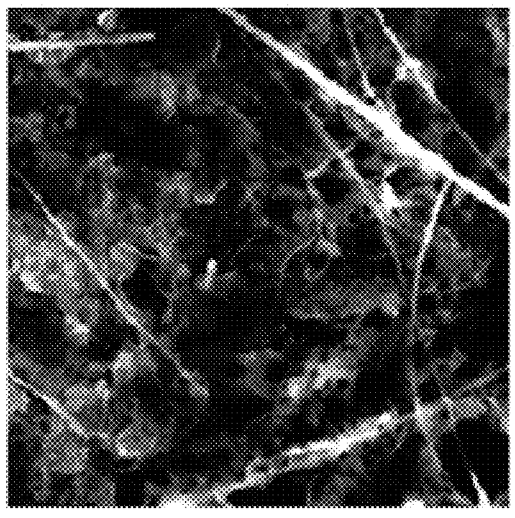
FIG. 13A is a SEM image of doped Na after cycling in full cells.
Figure 13B:
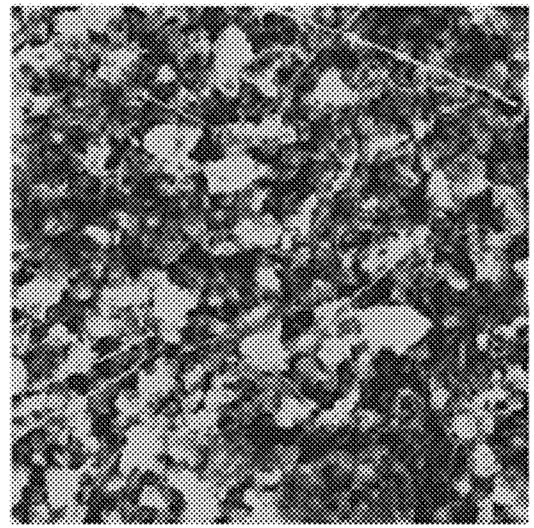
FIG. 13B is a SEM image of undoped Na after cycling in full cells.

The cycled batteries were then disassembled and the sodium anodes were analyzed using scanning electron microscope (FIGS. 13A and 13B). The surface of Sn-doped anode remained relatively flat without much porous architectures. The undoped Na anode, on the other hand, exhibited significant porous and mossy structures, causing the battery to fail within few hundred cycles.

REFERENCES

1. Yang, Z.; Zhang, J.; Kintner-Meyer, M. C. W.; Lu, X.; Choi, D.; Lemmon, J. P.; Liu, J., Electrochemical Energy Storage for Green Grid. *Chemical Reviews* 2011, 111 (5), 3577-3613.
2. Luo, C.; Shen, T.; Ji, H.; Huang, D.; Liu, J.; Ke, B.; Wu, Y.; Chen, Y.; Yan, C., Mechanically Robust Gel Polymer Electrolyte for an Ultrastable Sodium Metal Battery. *Small* 2020, 16 (2), 1906208.
3. Chi, S.-S.; Qi, X.-G.; Hu, Y.-S.; Fan, L.-Z., 3D Flexible Carbon Felt Host for Highly Stable Sodium Metal Anodes. *Advanced Energy Materials* 2018, 8 (15), 1702764.
4. Lu, K.; Gao, S.; Li, G.; Kaelin, J.; Zhang, Z.; Cheng, Y., Regulating Interfacial Na-Ion Flux via Artificial Layers with Fast Ionic Conductivity for Stable and High-Rate Na Metal Batteries. *ACS Materials Letters* 2019, 1.
5. Lee, B.; Paek, E.; Mitlin, D.; Lee, S. W., Sodium Metal Anodes: Emerging Solutions to Dendrite Growth. *Chemical Reviews* 2019, 119 (8), 5416-5460.
6 Cao, R.; Mishra, K.; Li, X.; Qian, J.; Engelhard, M. H.; Bowden, M. E.; Han, K. S.; Mueller, K. T.; Henderson, W. A.; Zhang, J.-G., Enabling room temperature sodium metal batteries. *Nano Energy* 2016, 30, 825-830.
7. Wang, S.; Chen, Y.; Jie, Y.; Lang, S.; Song, J.; Lei, Z.; Wang, S.; Ren, X.; Wang, D.; Li, X.; Cao, R.; Zhang, G.; Jiao, S., Stable Sodium Metal Batteries via Manipulation of Electrolyte Solvation Structure. *Small Methods* 2020, 4 (5), 1900856.
8. Gu, H.; Yang, L.; Zhang, Y.; Wang, C.; Zhang, X.; Xie, Z.; Wei, J.; Zhou, Z., Highly reversible alloying/dealloying behavior of SnSb nanoparticles incorporated into N-rich porous carbon nanowires for ultra-stable Na storage. *Energy Storage Materials* 2019, 21, 203-209.
9. Shi, Q.; Zhong, Y.; Wu, M.; Wang, H.; Wang, H., High-Performance Sodium Metal Anodes Enabled by a Bifunctional Potassium Salt. *Angewandte Chemie International Edition* 2018, 57 (29), 9069-9072.
10. Lee, Y.; Lee, J.; Lee, J.; Kim, K.; Cha, A.; Kang, S.; Wi, T.; Kang, S. J.; Lee, H.-W.; Choi, N.-S., Fluoroethylene Carbonate-Based Electrolyte with 1 M Sodium Bis(fluorosulfonyl)imide Enables High-Performance Sodium Metal Electrodes. *ACS Applied Materials & Interfaces* 2018, 10 (17), 15270-15280.
11. Zheng, J.; Chen, S.; Zhao, W.; Song, J.; Engelhard, M. H.; Zhang, J.-G., Extremely Stable Sodium Metal Batteries Enabled by Localized High-Concentration Electrolytes. *ACS Energy Letters* 2018, 3 (2), 315-321.
12. Wang, S.; Cai, W.; Sun, Z.; Huang, F.; Jie, Y.; Liu, Y.; Chen, Y.; Peng, B.; Cao, R.; Zhang, G.; Jiao, S., Stable cycling of Na metal anodes in a carbonate electrolyte. *Chemical Communications* 2019, 55 (95), 14375-14378.
13. Yu, Q.; Lu, Q.; Qi, X.; Zhao, S.; He, Y.-B.; Liu, L.; Li, J.; Zhou, D.; Hu, Y.-S.; Yang, Q.-H.; Kang, F.; Li, B., Liquid electrolyte immobilized in compact polymer matrix for stable sodium metal anodes. *Energy Storage Materials* 2019, 23, 610-616.
14. Luo, J.; Wang, C.; Wang, H.; Hu, X.; Matios, E.; Lu, X.; Zhang, W.; Tao, X.; Li, W., Pillared MXene with Ultralarge Interlayer Spacing as a Stable Matrix for High Performance Sodium Metal Anodes. *Advanced Functional Materials* 2019, 29 (3), 1805946.
15. Xu, Z.; Yang, J.; Zhang, T.; Sun, L.; Nuli, Y.; Wang, J.; Hirano, S.-i., Stable Na Metal Anode Enabled by a Reinforced Multistructural SEI Layer. *Advanced Functional Materials* 2019, 29 (27), 1901924.
16. Zhu, M.; Wang, G.; Liu, X.; Guo, B.; Xu, G.; Huang, Z.; Wu, M.; Liu, H.-K.; Dou, S.-X.; Wu, C., Dendrite-Free Sodium Metal Anodes Enabled by a Sodium Benzenedithiolate-Rich Protection Layer. *Angewandte Chemie International Edition* 2020, 59 (16), 6596-6600.
17. Luo, W.; Lin, C.-F.; Zhao, O.; Noked, M.; Zhang, Y.; Rubloff, G. W.; Hu, L., Ultrathin Surface Coating Enables the Stable Sodium Metal Anode. *Advanced Energy Materials* 2017, 7 (2), 1601526.
18. Niu, C.; Pan, H.; Xu, W.; Xiao, J.; Zhang, J.-G.; Luo, L.; Wang, C.; Mei, D.; Meng, J.; Wang, X.; Liu, Z.; Mai, L.; Liu, J., Self-smoothing anode for achieving high-energy sodium metal batteries under realistic conditions. *Nature Nanotechnology* 2019, 14 (6), 594-601.
19. Wang, Z.; Zhang, X.; Zhou, S.; Edström, K.; Strømme, M.; Nyholm, L., Lightweight, Thin, and Flexible Silver Nanopaper Electrodes for High-Capacity Dendrite-Free Sodium Metal Anodes. *Advanced Functional Materials* 2018, 28 (48), 1804038.
20 Ye, L.; Liao, M.; Zhao, T.; Sun, H.; Zhao, Y.; Sun, X.; Wang, B.; Peng, H., A Sodiophilic Interphase-Mediated, Dendrite-Free Anode with Ultrahigh Specific Capacity for Sodium-Metal Batteries. *Angewandte Chemie International Edition* 2019, 58 (47), 17054-17060.
21. Slotboom, J. W.; de Graaff, H. C., Measurements of bandgap narrowing in Si bipolar transistors. *Solid-State Electronics* 1976, 19 (10), 857-862.
22. Jensen, T.; Diening, A.; Huber, G.; Chai, B. H. T., Investigation of diode-pumped 2.8-μm Er: LiYF4 lasers with various doping levels. *Optics Letters* 1996, 21 (8), 585-587.
23. Arora, P. et al., Battery Separators *Chemical Reviews* 2004 104 (10), pg. 4419-4462.
24. Wang, et al., "Development of solid-state electrolytes for sodium-ion battery—A short review", Vol. 1, pp. 91-100 (2019)
25. Schroder et al., Comparatively assessing different shapes of litihium-ion battery cells, *ScienceDirect Procedia Manufacturing* 8 μg. 104-111 (2017).
26. U.S. Pat. No. 9,099,718
27 Brant et al., "Selective Control of Composition in Prussian White for Enhanced Material Properties", Chemistry of Materials, Vo. 31, No. 18, pp. 7203-7211 (2019)).
28 Komaba et al. "P2-type Nax[Fe1/2Mn1/2]$O_2$ made from earth-abundant elements for rechargeable Na batteries" Nature Materials, Vol. 11, No. 6, pp. 512-517 (2012).
29. Komaba et al., "P2-type Nax[Fe1/2Mn1/2]$O_2$ made from earth-abundant elements for rechargeable Na batteries", Nature Materials, Vol. 11, No. 6, pp. 512-517 (2012).
30 Keller et al., "Layered Na-Ion Cathodes with Outstanding Performance Resulting from the Synergetic Effect of Mixed P- and O-Type Phases", Advanced Energy Materials, Vol. 6, No. 3 (2016).
31. U.S. Pat. No. 10,263,254.
32. NEI Corporation, "sodium-ion battery materials", page last visited on Oct. 29, 2020 (www.neicorporation.com/products/batteries/sodium-ion-battery-materials/).

What is claimed is:

1. An anode, comprising:

sodium metal, and a dopant, in the sodium metal, wherein the anode has a thickness of at most 450 μm, the dopant is a metal with an electronegativity greater than the electronegativity of sodium, and the dopant is present in an amount of 0.01 to 1.0 atomic percent.

2. A method of making the anode of claim 1, comprising:

melting sodium metal, introducing a dopant metal into the sodium metal to form molten doped sodium metal, solidifying the doped sodium metal, and forming the doped sodium metal into a foil having a thickness of at most 450 μm.

3. A battery comprising:

an anode, an anode charge collecting element in contact with the anode, a cathode, a cathode charge collecting element in contact with the cathode, an electrolyte in contact with the anode and the cathode, and a housing, enclosing the anode, the anode charge collecting element, the cathode, the cathode charge collecting element and the electrolyte, wherein the anode comprises sodium metal doped with a dopant, and the dopant is present in an amount of 0.01 to 1.0 atomic percent.

4. A method of generating electrical power with the battery of claim 3, comprising: connecting the anode and cathode of the battery to an external load to complete a circuit.

5. The anode of claim 1, wherein the dopant is present in an amount of 0.1 to 0.3 atomic percent.

6. The anode of claim 1, wherein the anode has a thickness of at most 30 μm.

7. The anode of claim 1, wherein the dopant comprises at least one metal selected from the group consisting of: antimony, indium, lead, bismuth, thallium, and tin.

8. The anode of claim 1, wherein the dopant comprises tin.

9. The anode of claim 1, wherein the anode passes the resistance stability test.

10. The anode of claim 1, wherein the anode has a body centered cubic crystal structure.

11. The battery of claim 3, further comprising a separator in the housing.

12. The battery of claim 3, wherein the electrolyte is liquid.

13. The battery of claim 3, wherein the electrolyte comprises a salt, selected from the group consisting of: $NaPF_6$, $NaBF_4$, $NaClO_4$, and mixtures thereof, and a solvent, selected from the group consisting of carbonates, ethers and mixtures thereof.

14. The battery of claim 3, wherein the anode charge collecting element and the cathode charge collecting element comprise a material independently selected from the group consisting of: copper, aluminum, steel and combinations thereof.

15. The anode of claim 1, wherein the anode has a thickness of at most 15 μm.

16. The battery of claim 3, wherein the salt comprises $NaPF_6$, the solvent comprises ethylene carbonate and propylene carbonate, and the cathode comprises $Mo_6S_8$.

17. The battery of claim 3, wherein the battery retains at least 70% capacity after 800 cycles.

18. A method of making the battery of claim 3, comprising assembling the battery in dry air.

19. The anode of claim 5, wherein the anode has a thickness of at most 30 μm, and the dopant comprises tin.

20. The battery of claim 13, wherein:

the anode has a thickness of at most 30 μm, the dopant comprises at least one metal selected from the group consisting of: antimony, indium, lead, bismuth, thallium, and tin, the dopant is present in an amount of 0.1 to 0.3 atomic percent, and the battery retains at least 70% capacity after 800 cycles.

* * * * *